Patented Feb. 4, 1936

2,029,992

UNITED STATES PATENT OFFICE 2,029,992

FINISH REMOVING PROCESS

Carleton Ellis, Montclair, N. J., assignor to Chadeloid Chemical Company, New York, N. Y., a corporation of West Virginia No Drawing. Application September 17, 1932, Serial No. 633,689

5 Claims. (Cl. 87—5)

The present invention relates to improvements in the art of removing surface finish, such as paint, varnish, lacquer, shellac and the like, for example in cases where it is desired to refinish the surface. The present invention relates to a novel and highly effective method of procedure, irrespective of the particular composition of the liquid remover employed. In speaking of liquid removers herein, it is not desired to indicate that every particle of the remover is liquid, and in fact a typical remover which is suitable for employment in the present invention may consist of equal parts of benzol and acetone, to which 3% or so of paraffine wax or ceresin wax has been added, said wax not being wholly in solution in the final mixture but much of it being in more or less fine flocculated particles in suspension. Such a liquid remover can be prepared by melting the paraffine wax, and adding it in the liquid form to benzol, the latter being at ordinary room temperature, while stirring, after which a volume of acetone about equal to the volume of benzol can be added, preferably while stirring, the benzol being a wax solvent and the acetone being a wax precipitant. Other wax solvents and/or other wax precipitants can be employed and this example is given for "illustration only".

In accordance with the prior practice, as is well known, by the users of finish removers, the action of the remover on the finish coating forms a more or less gummy, slimy or sticky mass, which, for lack of a better name, can be termed "slush". The removal of this from the surface is sometimes difficult or troublesome and obviously this should be very thoroughly removed from the surface, and especially when a lacquer coating is to be subsequently applied, for the reason that a very little wax adhering to the surface will cause blemishes in the subsequently applied lacquer coating.

In accordance with the present invention I may apply any of the standard liquid finish removers, either of the type above referred to or various others, but preferably a remover containing wax as a retarder of evaporation. I may then allow the remover to act until it has cut through the entire thickness of the old finish coating "through to the wood" as the expression is ordinarily used in the trade. I then (or sooner if desired, but after the finish coats have been sufficiently softened) sprinkle over the surface a suitable solid absorbent material. The absorbent material is preferably a bulky finely divided loose solid absorbent material, for this purpose wood flour has given very satisfactory results, but it is to be understood that other solid absorbents such as fine sawdust, fine kieselguhr or infusorial earth and sometimes fine clay may be employed. These materials should of course be in the dry condition (i. e. air dry, not necessarily anhydrous) at the time of application. The amount of the absorbent material to be added can vary between very wide limits, and in fact it is impossible to give more than a very general statement as to the preferred amount to use, for the reason that the amount of slush on the surface of the material varies depending upon the amount and character of the original paint or varnish, the amount of remover applied and other factors. Very satisfactory results have been secured in some cases by simply scattering over the surface, a layer of wood flour or fine sawdust, of about one-sixteenth to one-eighth of an inch in thickness, more or less, in a rather non-uniform manner, but the amount to be used, as above stated, can vary between wide limits. In such a process, the remover is applied as usual, and is allowed to act on the old finish until the latter is well softened. Then handfuls of the absorbent material are thrown over the surface, in a direction more or less parallel with the surface, to spread out the absorbent material. Or the absorbent material can be sprinkled over a horizontal surface, from a coarse sifter, small shovel or scoop, or the like. The entire mixture can then be rubbed up with a suitable scrubbing brush or sometimes with a rag, an old newspaper or the like, or steel wood when the base is of metal.

The wood flour, rubbed up with the slush on the surface, does not harden nor does it enter into cracks in the surface to any undesirable extent, but by the action of stiff brushes or the like is converted into a mass having a consistency somewhat resembling slightly damp corn-meal, which material is easily brushed off the surface with a dust brush or whisk broom or when used on a floor, ordinary sweeping of the floor, with a broom or dust brush, will remove the mixture. The wood flour or similar material may be termed a "non-hardening and non-pigmenting slush absorbent".

After being rubbed up, (and after being brushed off if desired) the surface can be wiped off, as clean as possible with a rag or piece of waste or with newspaper or the like, and the surface can also be washed off with a rag or a piece of waste saturated with benzol or other solvent. In other instances gasoline or kerosene could be used for this latter purpose.

In another modification of the present invention I may first apply to the surface only a small quantity of liquid remover, say enough to moisten the surface. Then I sprinkle wood flour or other solid absorbent on the surface, then work this up by applying more remover with a brush or similar implement, and work the wood flour into the surface while the remover is acting upon the surface coating. The absorbent material and slush can be removed or cleaned off as in the preceding example.

After the surface has been worked somewhat under the brush, with the remover and absorbent, and after the action of the remover on the coating is substantially complete, the slush and absorbent can be removed, as has been customary in the prior art, by the use of a putty knife or scraping tool.

In accordance with the preferred form of the present invention, I preferably use such an amount of the finely divided absorbent material, as to substantially dry up the slush of soft coating and remover, so that this will be removed from the surface in the form of a mass resembling meal in consistency, rather than having to go through the present dirty job of cleaning up the slush as such, from the surface.

The powdered material such as wood flour can be applied in various manners, for example by sifting the same over the surface or by simply throwing the same from the hand of the workman in a direction more or less parallel with the surface under treatment.

I claim:—

1. A process of removing coatings of dried liquid coating compositions and the like, from a surface, which comprises applying to the said surface a liquid remover and allowing the same to act upon the coating to soften the same, applying a pulverulent solid absorbent, working the absorbent with the slush formed by action of the remover upon the coating finish, and removing the mixture from the surface, the total amount of said absorbent added being substantially enough to dry up the slush on said surface.

2. A process of applying finish removers, to a surface containing a dried coating of liquid coating composition and the like, which comprises applying the liquid remover to said surface, which remover is adapted to form a slush with the surface finish, allowing said remover to act upon the dried coating and form a slush, applying such an amount of a solid pulverulent absorbent material as will convert said slush into a mass of approximately meal-like consistency, which is easily removable by brushing.

3. A process of removing dried coatings of the type of paint, varnish, lacquer, shellac and the like, from a surface, which comprises applying to the said surface, a liquid remover capable of exerting a softening action upon said dried coating, and applying a finely divided granular to pulverulent solid absorbent material, applying more of the said liquid remover, and allowing the same to act upon and soften the dried coating, working the absorbent with the slush of softened finish, and removing the mixture from the said surface in the form of a substantially solid meal-like mass capable of being swept.

4. A process of removing a finish coating comprising dried liquid coating compositions and the like, which comprises applying a liquid remover upon and in intimate contact with said finish coating and allowing said remover to soften the finish coating, adding thereupon a layer of wood flour, in amount capable of absorbing the fluid slush of remover and softened finish, and rubbing up the material to give a loose material of a consistency capable of being swept up.

5. A process of removing finish coatings comprising dried liquid coating compositions and the like, from a substantially horizontal surface, which comprises applying a liquid finish remover to said surface, and allowing said remover to act upon said finish coating, thereafter applying over said surface, a layer of material having the consistency and absorbing properties of wood flour, working up the mass of material on the said horizontal surface into a consistency adapted to be swept, and sweeping the said material from said surface.

CARLETON ELLIS.